Nov. 13, 1928.　　　　　　　　　　　　　　　1,691,676
E. R. SMITH

DENTAL IMPRESSION TRAY

Filed May 18, 1926

INVENTOR
Ernest R. Smith
BY White Prost
his ATTORNEYS

Patented Nov. 13, 1928.

1,691,676

UNITED STATES PATENT OFFICE.

ERNEST ROBERT SMITH, OF SAN FRANCISCO, CALIFORNIA.

DENTAL IMPRESSION TRAY.

Application filed May 18, 1926. Serial No. 109,856.

This invention relates generally to trays employed by dentists for taking impressions of the teeth.

Dental trays employing separable elements are now in common use, one form being shown in my Patent No. 1,422,488, issued July 11, 1922, of which the invention herein disclosed is an improvement. In the structure shown in the above patent, the tray is formed of two separable sections which are retained together by a single nut, the nut having threaded engagement with a pair of complementary posts or studs secured to the respective tray sections. While such construction is an improvement over other forms of trays, it requires considerable time to engage the nuts with the threaded posts, and the sections cannot be quickly separated when positioned within the oral cavity of a patient.

It is an object of this invention to devise a fastening means for detachably securing the sections of a separable dental tray whereby the sections may be quickly secured together and separated.

It is a further object of this invention to construct a securing means for a separable dental tray in the form of a nut having cam faces which engage pins or projections secured to the sections of the tray.

Further objects of the invention will appear from the following description in which I have set forth the preferred embodiment of my invention. It is to be understood that the scope of this invention is to be determined from the appended claims taken in connection with the prior art.

Referring to the drawings.

Figure 1:
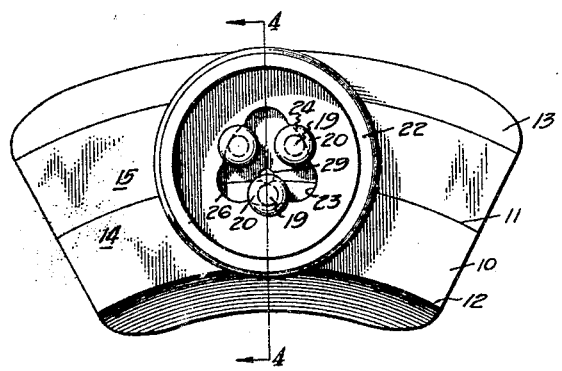
Figure 1 is a bottom plan view of a dental tray employing the principles of this invention.
Figure 2:
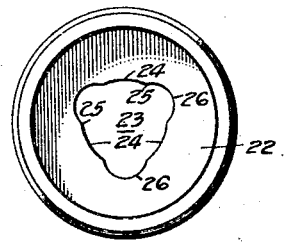
Fig. 2 is a detail showing the construction of the cam faces for the clamping nut.
Figure 3:
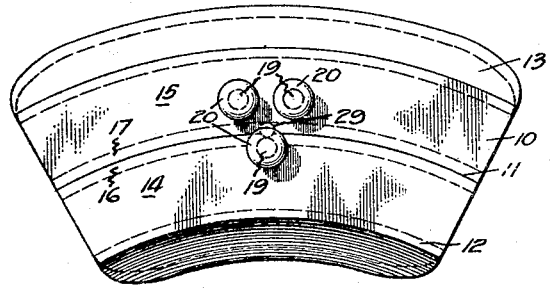
Fig. 3 is a view similar to Fig. 1 with the clamping nut removed.
Figure 4:
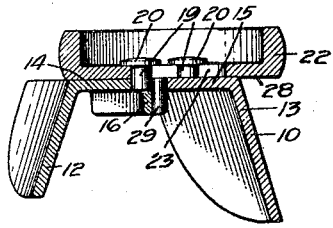
Fig. 4 is a cross section taken along the line 4—4 of Fig. 1.

The device comprises generally a dental tray 10 of any desired shape which is split along the dividing line 11 to form a pair of complementary tray sections 12 and 13. In the particular form of dental tray illustrated the two sections are L-shaped in cross section, the two portions 14 and 15 forming the base for the tray. The two portions 14 and 15 of the sections are preferably provided with flanges 16 and 17 whose opposed surfaces are adapted to be brought into clamping engagement.

For clamping the two sections together along the dividing line 11 the base of the tray is preferably provided with a plurality of projections or pins 19 which are preferably provided with heads 20. In the particular construction shown three projections 19 have been employed, one projection being upon one of the tray sections while the other two projections are upon the other section. In order to detachably engage the projections 19 for clamping the sections 12 and 13 together, there is provided a nut 22 which is preferably apertured as at 23 to provide a plurality of inner cam faces 24. Each of the cam faces 24 is cut along an arc having a radius of greater length than the distance between that particular cam face and the central intermediate point 25 between the cam faces. Between the cam faces are the cut-away portions 26, the number of cut-away portions and of the cam faces 24 being equal to the number of projections 19.

When the tray sections 12 and 13 are positioned in complementary relationship the nut 22 is adapted to be positioned over the projections 19 and upon rotation of the nut in either direction each of the cam faces 24 engage a projection 19 to effectively force the projections together and therefore clamp together the tray sections along the dividing line. The heads 20 upon the projections prevent accidental removal of the nut after being rotated in clamping position. The inner face 28 of the nut is preferably a plane surface which is adapted to fit flush against the bottom surface of the tray whereby it will serve to reinforce the tray sections when in clamping position.

When securing the two sections together it is desirable to have some means for matching together the opposed surfaces of the flanges 16 and 17 to insure accurate positioning of the dental tray sections and to facilitate positioning of the nut 22 upon the projections 19. This is accomplished by providing a small pin 29 secured to one of the tray sections and partly projecting so as to interrupt the dividing line 11. The complementary surface of the other section is recessed so as to fit around the projecting portion of this pin whereby in positioning the two sections together the flanges 16 and 17 must be matched before their opposed surfaces will meet along the dividing line 11.

In using the device the two tray sections 12 and 13 are matched together and detachably clamped by rotation of the nut 22 in either direction. Suitable plastic material is then placed within the tray and it is inserted over the teeth of a patient for taking the desired impression. When the plastic material has set the nut 22 may be readily removed while the tray is within the oral cavity of the patient, and the two sections then separated to remove the impression.

I claim:

1. A dental impression tray comprising a pair of complementary sections, means including a nut having a plurality of symmetrically disposed cam faces for detachably clamping and unclamping said sections by a rotation of said nut in either direction.

2. A device of the class described comprising a tray having a relatively flat base, said tray being split along a line intermediate said base thereby forming a pair of separable sections, at least one projection fixed to each section on said base, said projections having heads, and an apertured nut having inner cam faces adapted to engage said projections under said heads whereby said sections may be clamped together upon rotation of the nut.

3. A device of the class described comprising a tray having a relatively flat base, said tray being split along a line intermediate said base thereby forming a pair of separable sections, at least one projection fixed to each section on said base, said projections having heads, and an apertured nut having inner cam faces adapted to engage said projections under said heads whereby said sections may be clamped together upon rotation of the nut in either direction.

4. A sectional dental impression tray provided with means comprising a flat cam apertured disk for detachably securing the sections of said tray.

5. A dental impression tray comprising a pair of complementary sections, means including a nut having a plurality of cam faces for detachably clamping said sections together on rotation of the nut in either direction.

6. A dental impression tray comprising a pair of complementary sections and means including an apertured plate for detachably clamping said sections, the walls of the aperture in said plate defining a plurality of symmetrically disposed cam surfaces.

7. A sectional dental impression tray and detachable means provided with a central symmetrically scalloped aperture for detachably securing the sections of said tray.

In testimony whereof, I have hereunto set my hand.

ERNEST ROBERT SMITH.